US 8,645,272 B2

United States Patent
MacMillan et al.

(10) Patent No.: US 8,645,272 B2
(45) Date of Patent: Feb. 4, 2014

(54) SYSTEM AND METHOD FOR LOADING STORED VALUE ACCOUNTS

(75) Inventors: John A. MacMillan, Carp (CA); Marwan Forzley, Larchmont, NY (US); Samer Forzley, Ottawa (CA); Sheila H. James, Ottawa (CA)

(73) Assignee: Western Union Financial Services, Inc., Englewood, CO (US)

( * ) Notice: Subject to any disclaimer, the term of this patent is extended or adjusted under 35 U.S.C. 154(b) by 0 days.

(21) Appl. No.: 13/458,455

(22) Filed: Apr. 27, 2012

(65) Prior Publication Data

US 2013/0117177 A1 May 9, 2013

Related U.S. Application Data

(60) Provisional application No. 61/500,881, filed on Jun. 24, 2011.

(51) Int. Cl.
*G06Q 40/00* (2012.01)
(52) U.S. Cl.
USPC .............................................. 705/41; 705/35
(58) Field of Classification Search
USPC ................................................... 705/35, 41
See application file for complete search history.

(56) References Cited

U.S. PATENT DOCUMENTS

| | | | |
|---|---|---|---|
| 5,420,606 A | 5/1995 | Begum et al. | |
| 6,381,582 B1 | 4/2002 | Walker et al. | |
| 6,502,747 B1 | 1/2003 | Stoutenburg et al. | |
| 6,629,081 B1 | 9/2003 | Cornelius et al. | |
| 7,051,002 B2 | 5/2006 | Keresman, III et al. | |
| 7,249,069 B2 | 7/2007 | Alie et al. | |
| 7,499,875 B1 | 3/2009 | May et al. | |
| 7,593,893 B1 | 9/2009 | Ladd et al. | |
| 2001/0019604 A1 | 9/2001 | Joyce et al. | |
| 2002/0029248 A1 | 3/2002 | Cook et al. | |
| 2002/0029269 A1 | 3/2002 | McCarty et al. | |
| 2002/0035489 A1 | 3/2002 | Herman et al. | |
| 2002/0049670 A1 | 4/2002 | Moritsu et al. | |
| 2002/0059430 A1 | 5/2002 | Orbke et al. | |
| 2002/0099618 A1 | 7/2002 | Stiberman | |

(Continued)

FOREIGN PATENT DOCUMENTS

| | | |
|---|---|---|
| WO | 9966436 A1 | 12/1999 |
| WO | 0109756 A3 | 2/2001 |

OTHER PUBLICATIONS

Anonymous; "New Solutions"; BankNews media; Bank News; Feb. 2002.*

(Continued)

*Primary Examiner* — Edward Chang
(74) *Attorney, Agent, or Firm* — Kilpatrick Townsend & Stockton LLP (57) ABSTRACT

A system and method are provided which allow users to load stored value accounts through online bill payment. The system and method do not rely on the user loading the stored value account sharing online banking login information or account number/routing information. In an aspect, the method includes a user selecting online banking as a payment option, receiving a bill for the load amount, paying the bill through online banking bill pay, the system receiving notification from the bank of an online banking bill payment and the system notifying the stored value account provider of the payment. The cash settlement is released to a stored value account provider in response to load request.

17 Claims, 4 Drawing Sheets

(56) References Cited

U.S. PATENT DOCUMENTS

| | | |
|---|---|---|
| 2002/0161707 A1 | 10/2002 | Cole et al. |
| 2003/0004834 A1 | 1/2003 | Yamazaki |
| 2003/0046237 A1 | 3/2003 | Uberti |
| 2003/0126094 A1 | 7/2003 | Fisher et al. |
| 2003/0140004 A1 | 7/2003 | O'Leary et al. |
| 2003/0145205 A1 | 7/2003 | Sarcanin |
| 2003/0220835 A1 | 11/2003 | Barnes |
| 2004/0019605 A1* | 1/2004 | Keown et al. .............. 707/104.1 |
| 2004/0059688 A1 | 3/2004 | Dominguez et al. |
| 2004/0064407 A1 | 4/2004 | Kight et al. |
| 2004/0107146 A1 | 6/2004 | Alfano |
| 2004/0172552 A1 | 9/2004 | Boyles et al. |
| 2004/0254849 A1 | 12/2004 | Brocke-Benz |
| 2004/0260657 A1 | 12/2004 | Cockerham |
| 2005/0038707 A1 | 2/2005 | Roever et al. |
| 2005/0038738 A1 | 2/2005 | Peck et al. |
| 2005/0065883 A1 | 3/2005 | Dent et al. |
| 2005/0097320 A1 | 5/2005 | Golan et al. |
| 2005/0187878 A1 | 8/2005 | Khaishgi et al. |
| 2006/0282382 A1 | 12/2006 | Balasubramanian et al. |
| 2007/0174189 A1 | 7/2007 | Bishop et al. |
| 2008/0021803 A1 | 1/2008 | Ahles et al. |
| 2008/0140568 A1 | 6/2008 | Henry |
| 2008/0281726 A1 | 11/2008 | Gupta |
| 2009/0150299 A1 | 6/2009 | Moscal et al. |
| 2010/0274723 A1 | 10/2010 | Joao |

OTHER PUBLICATIONS

Xinhua News Agency; "Largest U.S. Banks Offers Fingerprint Access to Online"; CEIS; Jan. 7, 1999.*

* cited by examiner

SYSTEM AND METHOD FOR LOADING STORED VALUE ACCOUNTS

CROSS-REFERENCE TO RELATED APPLICATIONS

This application claims priority to U.S. Provisional Patent Application No. 61/500,881 filed Jun. 24, 2011, entitled "SYSTEM AND METHOD FOR LOADING STORED VALUE ACCOUNTS," the entire disclosure of which is hereby incorporated by reference, for all purposes, as if fully set forth herein.

BACKGROUND

Stored value accounts are gaining prevalence as they can be used to support an increasingly wide variety of new payment transactions as people become more comfortable with their use. Historically, stored value accounts were used for gift cards, reloadable prepaid cards, and for prepaid phone cards. In the case of cards, the funds and/or related data are often physically stored on the cards themselves, or accessible by entering a code number on the card into a telephone, computer or other device.

The use of these stored value accounts has expanded to include government payments (e.g. benefits, food stamps, tax returns), incentives (both corporate employee incentives and merchant incentives for consumers), and is becoming an engine to drive users to user payments, including remittance. Today, there are several companies developing new payment platforms centered on the concept of virtual wallets; these wallets are also driven by stored value accounts. All of these services require the consumer to easily load funds both offline and online.

There are several ways that consumers may currently load funds into stored value accounts including credit card, checks, ACH (Automated Clearing House) debit, payments at a physical location, and Paypal™.

In order to complete these transactions, online customers must provide financial information such as credit card and bank account number. Some require sensitive personal information such as social security number, or date of birth, or driver's license.

BRIEF SUMMARY

The present disclosure relates generally to payment processing. More particularly, the present disclosure relates to payment processing for loading stored value accounts.

Embodiments of the present disclosure provide improvements for loading stored value accounts and making remittance payments using online banking bill payment without providing sensitive financial information. Further, the embodiments described herein provide a benefit for stored value and remittance providers to receive guaranteed payments.

In some embodiments of the invention, a gateway subsystem is provided that acts as an intermediary for loading value on a stored value account using a bill payment subsystem associated with a user. For example, an electronic load request can be received at the gateway that includes information specifying the stored value account and/or the user. The gateway can then send a bill to the bill payment subsystem where the user is a subscriber. The bill payment subsystem can be included in the load requested or looked up in a database at the gateway. In response to sending the bill, a payment notification can be sent to the gateway from the bill payment subsystem. Funds can then be loaded on the stored value account from an account at the gateway. Funds can also be transferred or remitted from the bill payment subsystem to the gateway. Various other systems and methods are disclosed.

BRIEF DESCRIPTION OF THE DRAWINGS

The present invention is described in conjunction with the appended figures.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the various embodiments of the invention will provide those skilled in the art with an enabling description for implementing one or more embodiments of the invention. Various changes may be made in the function and arrangement of elements without departing from the spirit and scope of the invention as set forth in the appended claims. Various embodiments may be practiced with or without any given specific detail of any specifically described embodiment.

Circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments of the invention may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments.

A process may correspond to a method, a function, a procedure, a subroutine, a subprogram, etc.

The term "machine-readable medium" includes, but is not limited to transitory or non-transitory, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The term "load" is used herein to describe adding funds to an account, such as a stored value account. While funds can be loaded to a stored value account through any number of transaction, in embodiments of the invention funds can be loaded to the stored value account from a gateway subsystem. The funds can be in any currency, such as US Dollars, and can be converted to another currency or format before or after being added.

The term "stored value account" can relate to either a stored value card or a prepaid debit card. Monetary value associated with the card can be stored on the card (e.g., in magnetic storage) or in a database that associates card identification with monetary value. A stored value account can be associated with an anonymous user or with a named user. A stored value account can be associated with a closed system, a semi-closed system, or an open system.

Generally, embodiments of the invention provide systems and/or methods that allows a user to load funds from their DDA (Direct Deposit Account) using online banking bill payment to a stored value account without disclosing financial or sensitive information. System and/or methods are also provided that allow users to load stored value accounts through online bill payment. The system and method do not rely on the user loading the stored value account by sharing online banking information or account number/routing.

The method can include receiving a request from a stored value provider to load a stored value account. A bill can be generated for the load amount. A notification may be received by a cash based payment system indicating that an online banking bill payment has been made associated with the bill amount. As a result of the load request, a gateway system may process the payment—associating the payment with the bill and stored value account consumer—and notify a stored value provider that the payment is made and amount can be credited to the account.

In a further aspect, the present disclosure provides a method of automatically processing an online banking bill payment to load a stored value account involving a consumer paying to load a stored value account, a stored value account provider, a gateway system, and an online banking system. In an embodiment, the method includes: receiving an authorized cash payment request from a user loading a stored value account; submitting a request for payment to the consumer's bank in response to a determination that the loader is registered for auto payment with respect to the gateway system; and releasing the cash payment to the stored value account provider in response to receiving a load request from the user's bank.

In a further aspect, the method can include receiving a request directly from a stored value account holder. As a result of the request, the cash based payment system can verify the account holder's stored value account number with the stored value provider prior to authorizing the load and generating a bill.

In another aspect, the present disclosure provides a method of processing an online banking bill payment to submit a remittance payment from a user or a small or medium enterprise to another user or a small or medium enterprise. The method can include notifying a remittance provider that the payment has been received and the remittance provider can transfer funds to the receiver.

The system and method of embodiments described herein do not rely on the user sharing online banking login information or account number/routing information with the stored value provider. In an embodiment, the method includes a user selecting online banking as a payment option, receiving a bill for the amount they want to load, adding the gateway system as a payee in their online banking bill payment, making a bill payment for the amount they want to load into their stored value account, the gateway system receiving notification from the bank that a payment has been made, and the system notifying the stored value account provider of the payment. The cash settlement is released to a stored value account provider.

Accordingly, the present disclosure creates a new way for users to load stored value accounts online with cash available in their DDA account using their bank's online bill payment system without providing sensitive financial information to any party involved in the process. Embodiments of the present disclosure provide a streamlined online purchase experience, which is easy, and also less risky than providing routing and account information for an ACH debit transaction. Embodiments of the present disclosure also include the added security and other advantages of online bill payment for the user loading of the stored value account information.

Figure 1:
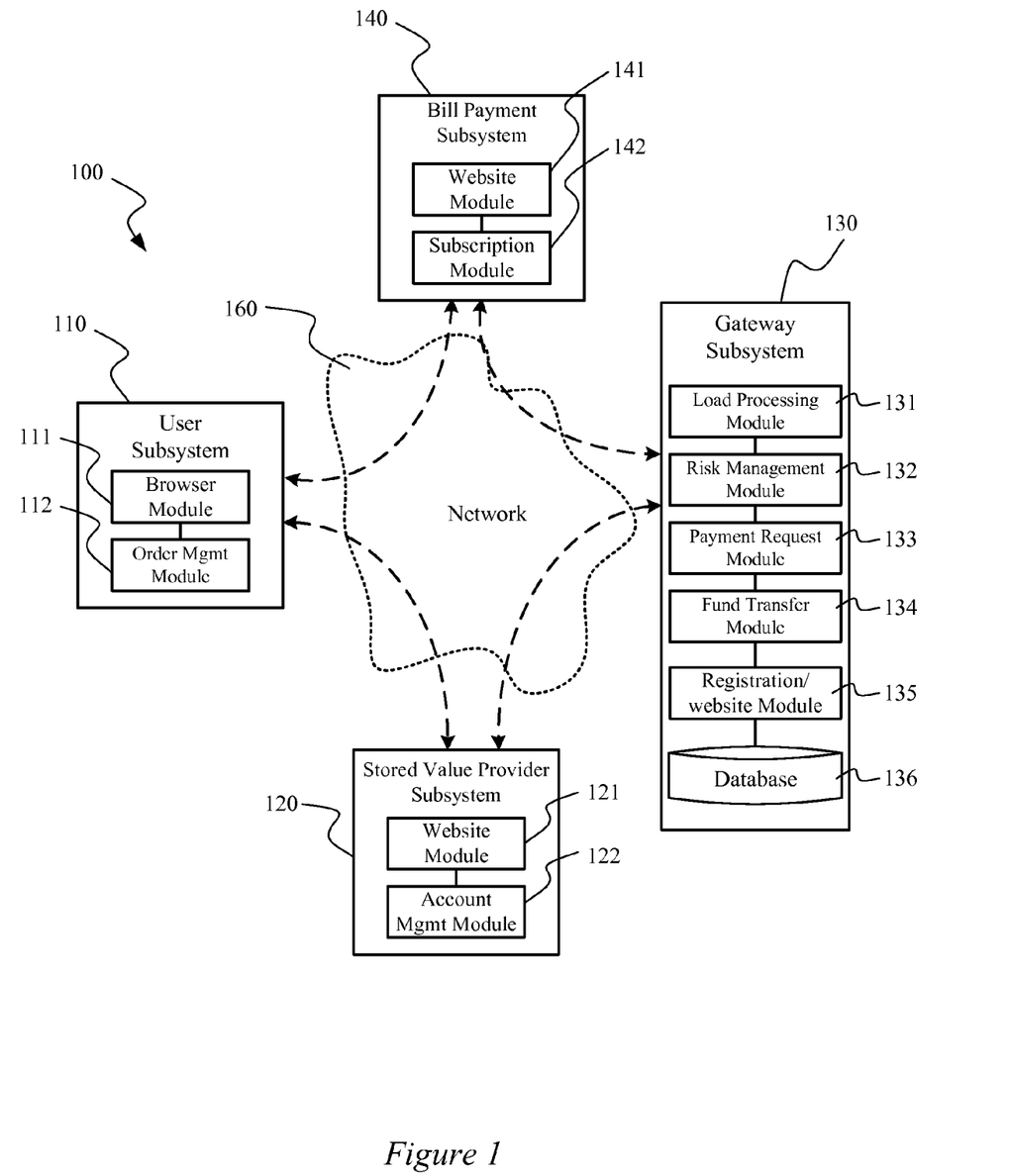
FIG. 1 illustrates a system for initiating a payment to a stored value account from a bill payment system for a user in a load request according to some embodiments of the invention.

FIG. 1 illustrates system 100 for initiating a payment to a stored value account from a bill payment system for a user in a load request according to some embodiments of the invention. System 100 can include user subsystem 110, stored value provider subsystem 120, gateway subsystem 130, and/or bill payment subsystem 140. Network 160 (e.g., the Internet or another banking or merchant network) may communicatively couple each of the subsystems.

User subsystem 110 may be used by a user to conduct various activities with system 100. User subsystem 110 may be used to access bill payment subsystem 140. For instance, a user may utilize browser module 111 to access an online interface of bill payment subsystem 140. The online interface of the bill payment subsystem can be presented and/or hosted by website module 141. For example, the user may view a web page of the entity operating the bill payment subsystem. Such an entity may be a financial institution such as a bank, a credit union, a credit card company, or a financial services provider such as a money transfer service. Through such access a user may subscribe to bill payment subsystem 140. A user may also provide account information to the bill payment subsystem 140 for loading a stored value card through gateway subsystem 130.

A user can also use user subsystem 110 to access a stored value account at stored value provider subsystem 120 to load funds to the user's account and/or select online banking as the payment method. For instance, a user may utilize browser module 111 to access an online interface of stored value provider subsystem 120 as presented by website module 121. For example, the user may view a web page of the entity operating the stored value provider subsystem. For example, stored value provider subsystem 120 can be accessed to submit loading details and/or user information for a stored value account load transaction to the gateway subsystem 130 and/or to direct the user's browser to the gateway subsystem 130. A stored value account load transaction is the transaction by which funds are added, or requested to be added, to the stored value account by the user. The user can be an individual, or a company such as a small and medium enterprise.

Bill payment subsystem 140 can allow a user to pay bills received at bill payment subsystem 140 or bills received independently from bill payment subsystem 140. The user may have the option in bill payment subsystem 140 to identify certain billers as being authorized to have their bills auto-paid. "Auto-paid" meaning that the user need not confirm that a bill from the authorized biller should be paid once received, but instead that once a bill from the biller is received, bill payment subsystem 140 should proceed to pay the bill without further instruction by the user. In some embodiments, the user may specify whether regularly occurring and/or non-regularly occurring bills are authorized for auto-payment. Moreover, the user may then add stored value provider subsystem 120 or gateway subsystem 130, and/or an entity associated with it, as an authorized auto-paid biller. All of this and other pertinent information regarding the user and his authorized auto-paid billers may be stored in subscription module 142. The user can provide limits on the frequency and/or amount of funds that can be auto-paid.

Gateway subsystem 130 can provide an intermediary between bill payment subsystem 140 and stored value provider subsystem 120. In some configurations gateway subsystem can be hosted by, managed, maintained, or part of either bill payment subsystem 140 or stored value provider subsystem 120.

In some embodiments, the user may access gateway subsystem 130, possibly via browser module 111. In some embodiments, the user may register with gateway subsystem 130 via registration module 135. In other embodiments, the user may be registered with gateway subsystem 130 based on an indication received from bill payment subsystem 140 or stored value provider subsystem 120. In some embodiments, the user may need to confirm with gateway subsystem 130 that a notification received from bill payment subsystem 140 or stored value provider subsystem 120 should be interpreted as an instruction to register the user with gateway subsystem 130. In any case, gateway subsystem 130 may or may not confirm with bill payment subsystem 140 or stored value provider subsystem 120 that gateway subsystem 130, and/or an entity associated with it, is confirmed as a pre-authorized biller by the user (or more specifically, a pre-authorized non-regularly occurring biller). Gateway subsystem 130 may possibly do this by conducting test billings for very small amounts (i.e., $0.03, $0.14, etc.) to determine if gateway subsystem 130 is properly confirmed and being auto-paid the same amounts by bill payment subsystem 140. Gateway subsystem 130 may also refund these amounts back to the user's bill payment account as well.

Gateway subsystem 130 can include load processing module 131 that can receive a load request from bill payment subsystem 140, stored value provider subsystem 120 or user subsystem 110. A load request can include a load amount, an account indicator that indicates the stored value card to be loaded (e.g., stored value account number), the name of the user, email address, a user account number or an order number, and/or an indication that payment may be remitted through bill payment subsystem 140. The load processing module 131 can determine whether the user or stored value account are registered for use with gateway subsystem 130. This can be done, for example, by looking up registration information in database 136. Load processing module 131 can also determine if the user has authorized loading of a stored value account through gateway subsystem 130.

Gateway subsystem 130 can include risk management module 132 that can determine a risk score for a given transaction. A risk score can be determined based on a payment amount, payment frequency, payment date, aggregated payment amounts over a period of time, etc. In this way, limits can be placed by the user (e.g., through browser module 111) on the amount and/or frequency of funds loaded to the stored value account. In some embodiments, risk management will only perform an analysis on auto-pay transactions. The risk score, for example, can include validating that order and user details are consistent with prior loading or bank details and accountholder details. The risk score, for example, can be based on configurable rules and that the order's risk score does not exceed a configurable threshold. If the risk score is above a certain threshold, for example, the risk management module can stop the payment transaction. In some embodiments the Gateway subsystem 130 can include payment request module 133 that can request payment from the bill payment subsystem 140 according to some embodiments of the invention. Once the payment identified in a load request is approved based on the risk management module 132, payment request module 133 can request payment from bill payment subsystem. In some embodiments that allow for auto-pay, payment request module 133 can facilitate auto-payment by requesting payments from bill payment subsystem as indicated by the user for auto-payment with or without first receiving a load request from bill payment subsystem 140. Payment from bill payment subsystem 140 may occur via fund transfer, ACH transfer, check, etc. Settlement may occur at some future time.

When load request is sent from bill payment 104, sensitive account information at bill payment subsystem 140 may not be comprised. Thus, in some embodiments, when the load request is received from bill payment subsystem 140, a request for payment may not be sent to the bill payment subsystem. The payment may already be in process awaiting remittance.

Gateway subsystem 130 can include fund transfer module 134 that can process payment from the bill payment subsystem 140 and/or load funds at the stored value provider subsystem 120. Fund transfer module 134, for example, can receive money transfer or remittance information from bill payment subsystem 140 and/or provide the proper documentation regarding the money transfer in the proper account ledger in database 208. Moreover, fund transfer module 134 can load funds to the stored value account at stored value provider subsystem 120 and/or update the account information in database 208 regarding the payment transfer. In some embodiments, the funds can be pulled from the gateway subsystem's general account and loaded on the stored value account at the stored value provider subsystem 120. Payment can be remitted from bill payment subsystem 140 before or after this transfer.

Stored value provider subsystem 120 can include website module 121 and/or account management module 122. A user may utilize browser module 111 to access an online interface of stored value provider subsystem 120. The online interface of stored value provider subsystem 120 can be presented and/or hosted by website module 121. The user can access account information and/or change account details through website module 121 by using account management module 122.

In some embodiments, bill payment subsystem 140 may or may not send an indication to stored value provider subsystem 120 and/or gateway subsystem 130 that bill payment subsystem 140 and/or an entity associated with it is preauthorized for auto-payment of bills received from it. In some embodiments, limits on the size (i.e., monetary amount) and/or type of purchases (i.e., types of goods and/or services) which are pre-authorized may exist, either at the behest of the user, or based on bill payment subsystem 140 operating protocols. In some embodiments, the bill payment subsystem may run a risk analysis, as known in the art, on the user to determine auto-payment limits. In any case, the established limits may or may not be communicated to stored value provider subsystem 120.

In some embodiments, once a load transaction is in process, the user may inform stored value provider subsystem 120 that gateway subsystem 130 will be used to load a stored value account. In some embodiments, this may involve user subsystem 110 providing an account number, authentication value, or other information identifying user's account at gateway subsystem 130 to stored value provider subsystem 120. In turn, stored value provider subsystem 120 may then communicate load transaction information with gateway subsystem 130 to effectuate payment from gateway subsystem 130 to stored value provider subsystem 120. The load transaction information may include account information associated with gateway subsystem 130, a payment request authorized by the user for a specific amount, as well as an identifier associated with the stored value provider (possibly a financial account number associated with the stored value provider). As used herein, when an account is said to be "associated with" a party, it is understood that the account is controlled by, and the balance the property of, the party.

In other embodiments, stored value provider subsystem 120 will not receive any information regarding the user's arrangement with gateway subsystem 130. Instead, user subsystem 110 may inform gateway subsystem 130 of the load transaction information described above. In these embodiments, stored value provider subsystem 120 may be informed that a payment is to be expected from gateway subsystem 130. In yet other embodiments, both user subsystem 110 and stored value provider subsystem 120 may inform gateway subsystem 130 of the load transaction information, and gateway subsystem 130 may verify that the information provided by each subsystem matches before proceeding with the load transaction. Gateway subsystem 130 may store the load transaction information at load processing module 131.

In some embodiments, a user can select online banking as a payment option with the stored value provider. The user can receive a bill for the load amount and pay the bill through online banking bill pay. Then the bill payment system can send an indication to the stored value provider that an online banking bill payment has occurred. A cash settlement can then be released to a stored value account provider in response to load request. Thus, in some embodiments, gateway 103 can be by passed by allowing user to request bill payment directly from bill payment subsystem 140 to the stored value provider subsystem 120.

Figure 2:
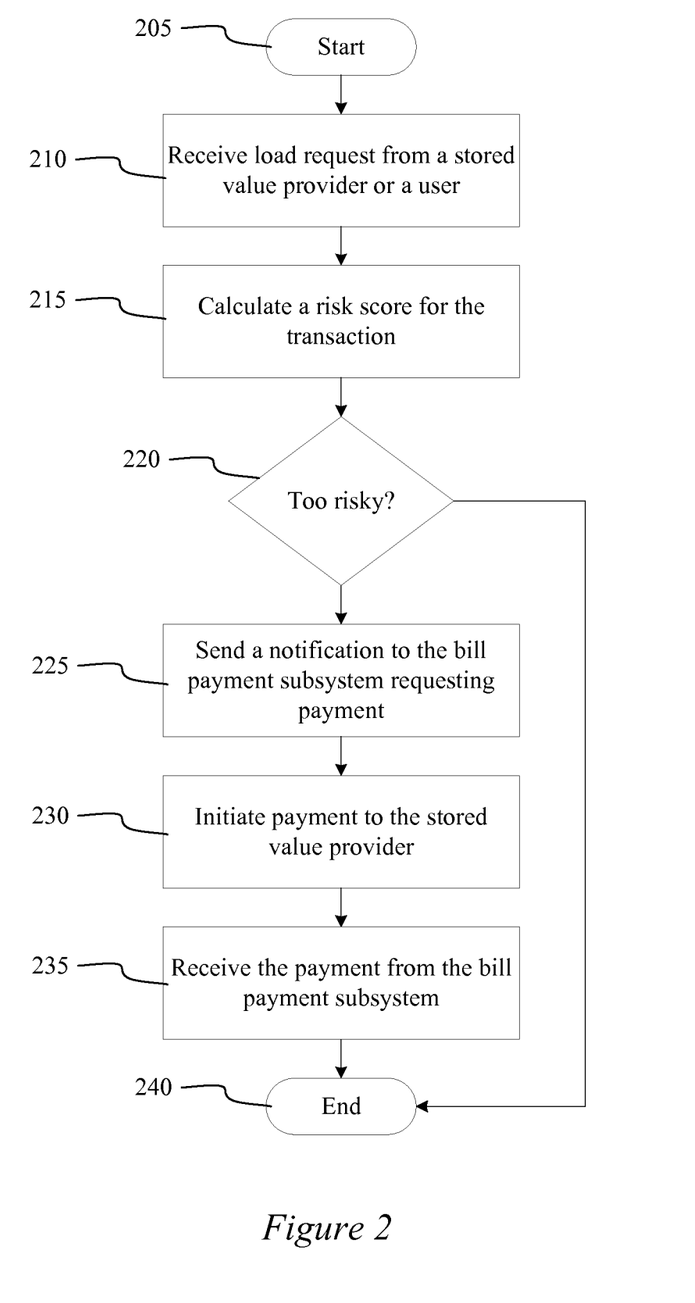
FIG. 2 is a flowchart of process 200 for loading funds to a stored value account from a request from a stored value provider or a user according to some embodiments of the invention.

FIG. 2 is a flowchart of process 200 for loading funds to a stored value account from a request from a stored value provider or a user according to some embodiments of the invention. Process 200 can be implemented, for example, at gateway subsystem 130 shown in FIG. 1. Process 200 can start at block 205. At block 210 a load request is received from a user or a stored value provider. The load request can be received, for example, at gateway subsystem 130. The load request can include a load amount and/or stored valued account information. At block 215 a risk score can be determined. The risk score can be used to determine the risk that the load request is fraudulent or not. Various factors discussed elsewhere can be used to determine the risk score. If the risk score is beyond a certain threshold as noted at block 220, then process 200 can end at block 240. In some embodiments, a notification can be sent to the user and/or the stored value provider when a load transaction is deemed too risky.

If the load transaction is not deemed too risky, then process 200 proceeds to block 225 where a notification is sent to the bill payment subsystem requesting payment. In some embodiments, the notification can be sent to the user who then forwards it to or signs up the gateway for payment through bill payment subsystem 140. The notification can be created, for example, by looking up bill payment information in database 136 that is associated with the account number provided in the load request. Once the bill payment information is determined, the payment request can be sent to the bill payment subsystem (or the user). The payment request can include at least the payment amount and a bill payment account number that is to be used for the payment. If the bill payment subsystem is previously set up for auto-payment, then process 200 proceeds to block 230. Funds are loaded onto the stored value account by transferring funds to the stored value provider with an indication that indicates the stored value account where the funds are to be loaded. Any fund transfer process can be used. Payment from the bill payment subsystem can be remitted at block 235. This remittance can occur at some later point in time. Process 200 can end at block 240.

In some embodiments, gateway 103 can deduct a processing for processing the transaction. For example, gateway 103 may transfer a percentage of the funds required.

Figure 3:
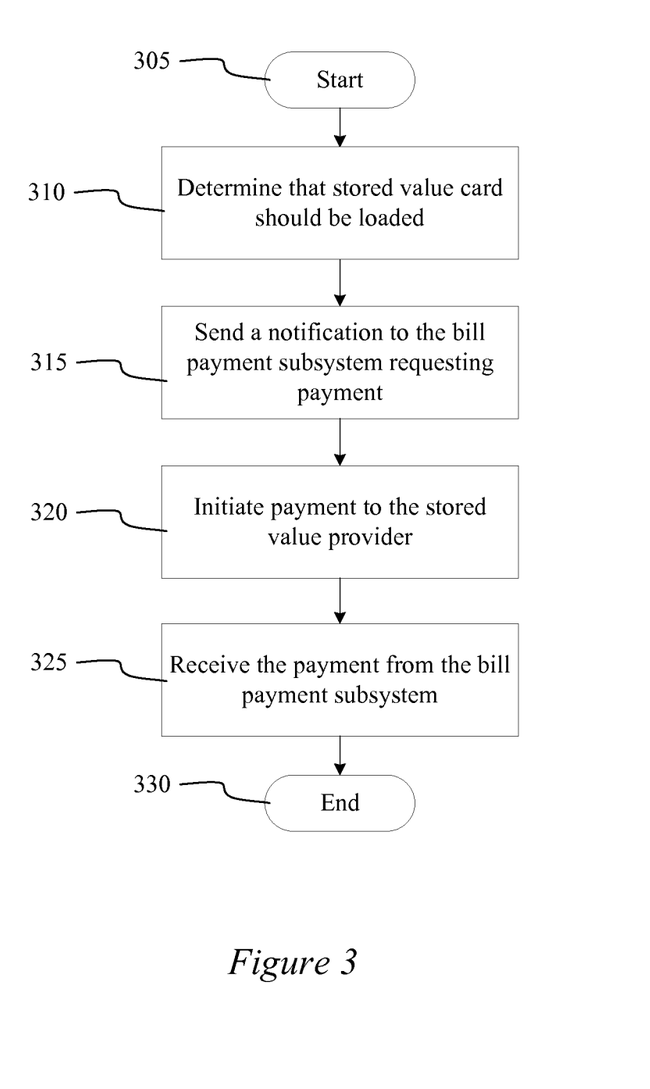
FIG. 3 is a block diagram illustrating an exemplary computer system 300 that can be used to implement various embodiments of the invention.

FIG. 3 is a flowchart of process 300 for loading funds to a stored value account according to some embodiments of the invention. Process 300 can be implemented, for example, at gateway subsystem 130 shown in FIG. 1. Process 300 can start at block 305. At block 310, it can be determined that a stored value account should be loaded with funds. This can occur based on a recurring auto payment indication. That is, gateway 103 can determine that stored value account should be loaded with funds because an authenticated user has indicated that the stored value account should be loaded when certain events occur, such as at certain periods of time, when a certain notification has been received from a third party, when a certain threshold amount is reached in the stored value account, etc. In some cases, this determination can be reached when a bill payment subsystem indicates that a bill payment is being sent or has been sent.

At block 315 a notification can be sent to the bill payment subsystem requesting payment. Block 315 can be avoided when block 310 is initiated in response to a bill payment sent by bill payment subsystem. The notification can sent, for example, after looking up bill payment information in a database. Once the bill payment information is determined, the payment request can be sent to the bill payment subsystem. The payment request can include at least the payment amount and a bill payment account number that is to be used for the payment. If the bill payment subsystem is previously set up for auto-payment, then process 300 proceeds to block 320. Funds are loaded onto the stored value account by transferring funds to the stored value provider with an indication that indicated the stored value account where the funds are to be loaded. Any fund transfer process can be used. Payment from the bill payment subsystem can be remitted at block 325. This remittance can occur at some later point in time. Process 300 can end at block 330.

Figure 4:
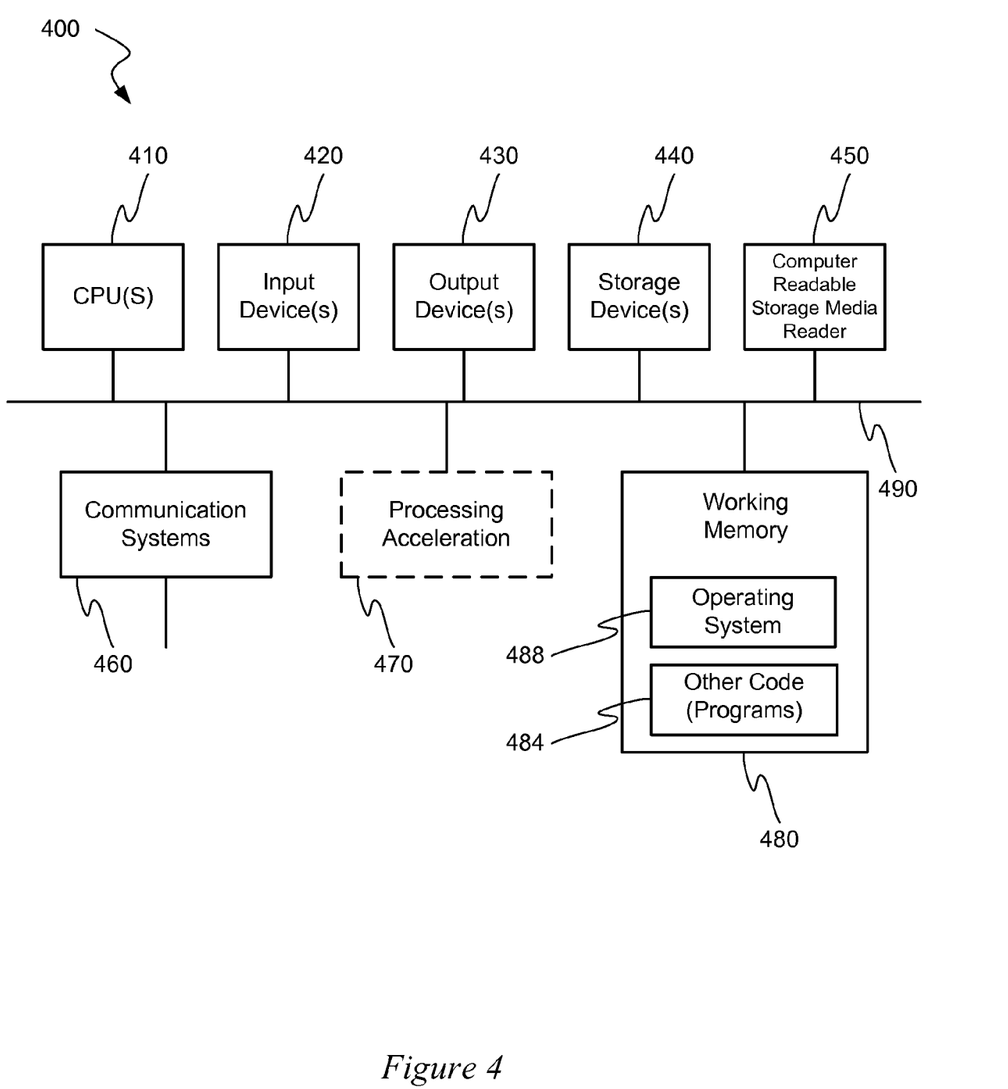
FIG. 4 illustrates a block diagram of a computer system capable of being used in at least some portion of the apparatuses or systems of the present invention, or implementing at least some portion of the methods of the present invention.

FIG. 3 is a block diagram illustrating a computer system 400 that can be used to implement various embodiments of the invention. For example, computer system 400 can be used, in whole, in part, in conjunction with another computer system, or with various modifications, to provide the functions of the stored value provider subsystem, user subsystem, bill payment subsystem, gateway subsystem, and/or other components of the invention such as those discussed above. Computer system 400 can execute all or part of process 200 and/or process 300. For example, various functions of the gateway subsystem may be controlled by computer system 400, including, for example, receiving load request information, determining registration status of a user, sending load requests, receiving load requests, causing payments to be made, loading funds, hosting a website, etc.

While a number of processes have been described a bill payment to a stored value account can occur in a number of ways initiated by different subsystems. Each of these can implement various other details described herein. In some embodiments a user can initiate the process in two ways. First, the user can request a loading of the stored value account from bill payment subsystem 140. Bill payment subsystem can then remit payment to gateway subsystem 130, which then loads the stored value account at stored value provider subssytem 120, or directly to stored value provider subssytem 120. Second, as shown by process 200, the user can also send a request to gateway subsystem 130 whereupon gateway subsystem 130 can send a load bill to bill payment subsystem 140 that includes account information and payment amounts. After which bill payment subsystem 140 can remit payment to gateway subsystem 130.

In other embodiments, stored value provider subsystem 120 can initiate loading of the stored value account in two ways. First, as shown by process 200, stored value provider subssytem 120 can send a request to gateway subsystem 130 where upon gateway subsystem 130 can send a load bill to bill payment subsystem 140 that includes account information and payment amounts. After which bill payment subsystem 140 can remit payment to gateway subsystem 130. Second, stored value provider subssytem 120 can send a load payment directly to bill payment subsystem 140. Bill payment subsystem 140 can remit payment directly to stored value provider subssytem 120.

In other embodiments, gateway subsystem 130 can initiate loading of the stored value account in two ways. First, as shown in process 300, gateway subsystem 130 can send a load bill to bill payment subsystem 140. Second, gateway subsystem 130 can send a load bill to the user who then forwards it to the bill payment subsystem or pays the bill using the bill payment subsystem.

In yet other embodiments, bill payment subsystem can initiate loading of the stored value account in two ways. First, bill payment subsystem 140 can load stored value account directly with stored value provider subsystem 120. Second, bill payment subsystem 140 can initiate payment through gateway subsystem 130.

Computer system 400 includes hardware elements that may be electrically coupled via a bus 490. The hardware elements may include one or more central processing units 410, one or more input devices 420 (e.g., a mouse, a keyboard, etc.), and one or more output devices 430 (e.g., a display device, a printer, etc.). Computer system 400 may also include one or more storage device 440. For example, storage device(s) 440 may be disk drives, optical storage devices, solid-state storage device such as a random access memory ("RAM") and/or a read-only memory ("ROM"), which can be programmable, flash-updateable and/or the like.

Computer system 400 may additionally include a computer-readable storage media reader 450, a communications system 460 (e.g., a modem, a network card (wireless or wired), an infra-red communication device, Bluetooth™ device, cellular communication device, etc.), and working memory 480, which may include RAM and ROM devices as described above. In some embodiments, computer system 400 may also include a processing acceleration unit 470, which can include a digital signal processor, a special-purpose processor and/or the like.

Computer-readable storage media reader 450 can further be connected to a computer-readable storage medium, together (and, optionally, in combination with storage device(s) 440) comprehensively representing remote, local, fixed, and/or removable storage devices plus storage media for temporarily and/or more permanently containing computer-readable information. Communications system 460 may permit data to be exchanged with a network, system, computer and/or other component described above.

Computer system 400 may also comprise software elements, shown as being currently located within a working memory 480, including an operating system 484 and/or other code 488. It should be appreciated that alternate embodiments of computer system 400 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 400 may include code 488 for implementing any or all of the function of the various elements of the architecture as described herein. For example, software, stored on and/or executed by a system such as computer system 400, can provide the functions of the stored value provider subsystem, user subsystem, bill payment subsystem, gateway subsystem, and/or other components of the invention such as those discussed above. Methods implementable by software on some of these components have been discussed above in more detail.

The invention has now been described in detail for the purposes of clarity and understanding. However, it will be appreciated that certain changes and modifications may be practiced within the scope of the appended claims.

What is claimed is:

1. A gateway system for loading funds to a stored value account provider from a bill payment system associated with a user, the gateway system comprising:
   a processor; and
   a non-transitory storage medium having instructions thereon, the instructions executable by the processor for:
      receiving a load request, wherein the load request includes load request information, wherein the load request information includes a stored value account including an identifier associated with a stored value account and an amount of funds to load to the stored value account;

sending a bill to a bill payment system of which a user is a subscriber, wherein the bill includes the amount of funds to load and an indication of the stored value account identifier;

receiving a payment notification from the bill payment system that indicates that payment has been made;

causing a first payment to be made from a first account associated with the gateway system to a second account associated with the stored value account provider;

wherein the identifier associated with the stored value account comprises an account number of the second account; and wherein causing a first payment to be made from a first account associated with the gateway system to a second account associated with the stored value account provider occurs in response, at least in part, to receiving a second payment from a third account associated with the user to the first account associated with the gateway system.

2. The system according to claim 1, wherein the load request is received from the user.

3. The system according to claim 1, wherein the load request is received from the stored value provider.

4. The system according to claim 1, wherein receiving the load request comprises receiving the load request from a user system operated by the user.

5. The system according to claim 1, wherein receiving the load request comprises receiving the load request information from a stored value account provider system.

6. The system according to claim 1, wherein receiving the load request comprises:

receiving load request information from a user system operated by the user;

receiving load request information from a stored value account provider system; and verifying that the load request information from the user subsystem matches the load request information from the stored value account provider system.

7. The system according to claim 1, wherein the payment notification comprises an affirmation that a second payment has been made from a third account associated with the user to the first account associated with the gateway system.

8. The system according to claim 1, wherein the instructions are further executable by the processor for determining whether the user is registered with the gateway system.

9. The system according to claim 8, wherein determining whether the user is registered with the gateway system comprises:

determining that the user subscribes to the bill payment system; and determining that the user has approved the gateway system as an auto-pay payee in the bill payment system.

10. The system according to claim 9, wherein determining that the user has approved the gateway system as an auto-pay payee in the bill payment subsystem comprises:

determining that the user has, prior to the gateway system receiving the load request, approved the gateway system as an auto-pay biller in the bill payment subsystem.

11. The system according to claim 1, wherein sending the bill to the bill payment system of which the user is a subscriber occurs in response, at least in part, to determining that the user is registered with the gateway system.

12. The system according to claim 1, wherein causing a first payment to be made from a first account associated with the gateway subsystem to a second account associated with the stored value account provider occurs in response, at least in part, to receiving the payment notification from the bill payment system.

13. A non-transitory computer-readable medium with an executable program stored thereon for initiating a payment to a stored value account provider from a bill payment system for a user, the user being a subscriber of the bill payment system, wherein the executable program instructs at least one processor to:

receive load request information, the load request information including: a load request authorized by the user; and an identifier associated with a stored value account;

determine that the user is listed in a registration database of a gateway system using the load request information;

send a payment request to the bill payment system of which the user is the subscriber, wherein the payment request includes the amount of funds to load and an indication of the stored value account identifier;

receive a payment notification from the bill payment system;

cause a first payment to be made from a first account associated with the gateway system to a second account associated with the stored value account provider;

wherein the identifier associated with the stored value account comprises an account number of the second account; and wherein causing a first payment to be made from a first account associated with the gateway system to a second account associated with the stored value account provider occurs in response, at least in part, to receiving a second payment from a third account associated with the user to the first account associated with the gateway system.

14. The non-transitory computer-readable medium of claim 13, wherein the executable program further instructs at least one processor to:

receive a registration request from the user;

receive a bill payment account number from the user; and register the user by listing the user in the registration database with the bill payment account number.

15. The non-transitory computer-readable medium of claim 13, wherein the executable program further instructs at least one processor to:

receive a registration request from the user;

receive a bill payment account number from the bill payment system; and register the user by listing the user in the registration database with the bill payment account number.

16. A computer implemented method for initiating a payment to a stored value account provider from a bill payment system for a user, the user being a subscriber of the bill payment system, wherein the method comprises:

Receiving, at a gateway system device, load request information, the load request information including: a load request authorized by the user; and an identifier associated with a stored value account;

determining, at the gateway system device, that a stored value account should be loaded with funds using the load request information;

sending a payment request to the bill payment system of which the user is the subscriber, wherein the payment request includes the amount of funds to load and an indication of the stored value account identifier;

receiving a payment notification from the bill payment system;

causing a first payment to be made from a first account associated with the gateway system device to a second account associated with the stored value account provider;

wherein the identifier associated with the stored value account comprises an account number of the second account; and wherein causing a first payment to be made from a first account associated with the gateway system device to a second account associated with the stored value account provider occurs in response, at least in part, to receiving a second payment from a third account associated with the user to the first account associated with the gateway system device.

17. The computer implemented method according to claim 16, wherein the payment notification comprises an affirmation that a second payment has been made from a third account associated with the user to the first account associated with the gateway system.

* * * * *